United States Patent
Chevalier et al.

(10) Patent No.: US 6,235,087 B1
(45) Date of Patent: May 22, 2001

(54) DEVICE FOR SUPPLYING A PURIFIED GAS TO A PLANT PURGED USING THIS PURIFIED GAS

(75) Inventors: Gilbert Chevalier, Voisins le Bretonneux; Pascal DuPont, Velizy Villacoublay, both of (FR)

(73) Assignee: L'Air Liquide, Societe Anonyme pour l'Etude et l'Exploitation des Procedes Georges Claude, Paris (FR)

( * ) Notice: Subject to any disclaimer, the term of this patent is extended or adjusted under 35 U.S.C. 154(b) by 0 days.

(21) Appl. No.: 09/313,368

(22) Filed: May 18, 1999

(30) Foreign Application Priority Data

May 28, 1998 (FR) .................................................. 98 06721

(51) Int. Cl.$^7$ .................................................. B01D 53/22
(52) U.S. Cl. .......................................................... 96/9; 96/4
(58) Field of Search .............................. 96/4, 7–14, 397, 96/413

(56) References Cited

U.S. PATENT DOCUMENTS

| | | | |
|---|---|---|---|
| 4,857,082 | * | 8/1989 | DiMartino, Sr. et al. ............. 96/7 X |
| 5,053,058 | * | 10/1991 | Mitariten ................................. 96/4 X |
| 5,063,753 | * | 11/1991 | Woodruff ................................ 96/8 X |
| 5,102,432 | * | 4/1992 | Prasad ..................................... 96/9 X |
| 5,152,966 | * | 10/1992 | Roe et al. ................................ 96/8 X |
| 5,240,471 | * | 8/1993 | Barbe et al. ............................. 95/54 |
| 5,266,101 | * | 11/1993 | Barbe et al. ............................. 95/23 |
| 5,290,341 | * | 3/1994 | Barbe ...................................... 95/54 |
| 5,308,382 | * | 5/1994 | Prasad ..................................... 95/12 |
| 5,332,547 | | 7/1994 | Olson et al. ............................. 422/3 |
| 5,378,283 | | 1/1995 | Ushikawa ............................. 118/719 |
| 5,378,439 | * | 1/1995 | Delobel et al. ....................... 423/210 |
| 5,383,957 | * | 1/1995 | Barbe et al. ............................. 96/8 |
| 5,538,536 | * | 7/1996 | Fuentes et al. .......................... 96/9 X |
| 5,644,855 | * | 7/1997 | McDermott et al. ................... 34/516 |
| 5,649,995 | * | 7/1997 | Gast, Jr. .................................. 96/8 X |
| 5,676,736 | * | 10/1997 | Crozel ..................................... 96/4 X |
| 5,785,741 | * | 7/1998 | Li et al. ................................... 96/4 |
| 5,858,065 | * | 1/1999 | Li et al. ................................... 96/4 X |

FOREIGN PATENT DOCUMENTS

| | | |
|---|---|---|
| 0 585 158 | 3/1994 | (EP) . |
| 0 754 487 | 1/1997 | (EP) . |

* cited by examiner

*Primary Examiner*—Robert H. Spitzer
(74) *Attorney, Agent, or Firm*—Burns, Doane, Swecker & Mathis, L.L.P.

(57) ABSTRACT

The invention relates to a device for supplying a purified gas to a plant which is purged with purified gas. The device includes a feed line connected, on the one hand, to a source of substantially pure gas and, on the other hand, to an inlet of the plant. The purified gas being passed therethrough is contaminated with impurities. The device further includes a line which is intended to recover the contaminated gas at the outlet of the plant and is connected to the feed line. The lines are arranged one after the other downstream of where the recovery line is connected to the feed line, a compressor and a device for separating the impurities from the contaminated gas by permeation in order to supply a purified gas to the plant.

14 Claims, 3 Drawing Sheets

DEVICE FOR SUPPLYING A PURIFIED GAS TO A PLANT PURGED USING THIS PURIFIED GAS

BACKGROUND OF THE INVENTION

1. Field of the Invention

The invention relates to a device for supplying a purified gas to a plant which is purged using this purified gas, comprising a feed line which is connected, on the one hand, to a source of the purified gas and, on the other hand, to an inlet of the plant.

2. Description of the Related Art

A wide variety of plants, for example in the fabrication of electronic components, require the use of filtered and inert atmospheres.

For example, silicon wafers intended to carry microelectronics circuits are stored in an enclosed space with a nitrogen atmosphere which has only a few ppm of impurities, consisting in particular of oxygen. One example for storing and transporting wafers is described in U.S. Pat. No. 5,644,855.

Given that the purified gas is progressively contaminated with impurities, it is necessary to replenish the nitrogen atmosphere in the enclosed space as time progresses. This replenishment is generally carried out by supplying the enclosed space constantly with a certain flow of purified nitrogen coming from a purified gas source, and by discharging the contaminated nitrogen.

However, the cost of purified nitrogen is very high, so that replenishing the inert atmosphere in the storage space represents a significant contribution to its running costs.

Furthermore, these known plants also have the drawback that, if there is a fault with the source of the purified gas, all parts of the plant which are purged will be affected by this, which in the aforementioned example may make it necessary to discard all the silicon wafers stored.

Systems for separating gases using a membrane, which are applicable to electronics or other fields, are known in particular from EP-A-754 487 as well as U.S. Pat. Nos. 5,308,382, 5,240,471, 5,290,341, 5,378,439 and 5,383,957.

The object of the invention is to overcome these various drawbacks by providing a device for supplying a purified gas, in particular nitrogen, to a plant such as, for example, a wafer storage space for microelectronics, which makes it possible on the one hand to reduce the running cost of such a plant and, on the other hand, to give the plant some degree of autonomy from the source.

SUMMARY OF THE INVENTION

To this end, the invention relates to a device for supplying a purified gas to a plant which is purged using this purified gas, comprising a feed line which is connected, on the one hand, to a source of the substantially pure gas and, on the other hand, to an inlet of the plant, the purified gas being contaminated with impurities on passing through the plant, characterized in that it furthermore comprises a line which is intended to recover the contaminated gas at the outlet of the plant and is connected to the feed line and, arranged one after the other downstream of where the recovery line is connected to the feed line, a compressor and means for separating the impurities from the contaminated gas by permeation in order to supply a purified gas to the plant.

The plant according to the invention may have one or more of the following characteristics:

the permeate obtained by the separation means principally consists of impurities, the permeate obtained by the separation means principally consists of the purified gas, the separation means comprise, arranged in series, a first and a second permeater, the permeate of one of the permeaters principally consisting of impurities whose permeation rate is higher than that of the purified gas to be supplied to the plant, and the permeate of the other principally consisting of the purified gas, the separation means comprise, for each permeater, a line for discharging the impurities, and a valve which is arranged in this impurity discharge line and is controlled by means for detecting the residual level of impurities in the purified gas at the outlet of the permeater, it furthermore comprises, arranged in the feed line upstream of where the recovery line is connected to the feed line, means for buffer storage of the substantially pure gas, the buffer storage means comprise a reservoir for storing the pure gas under pressure, a non-return valve arranged in the feed line upstream of the storage reservoir, and a regulating valve which is arranged in the feed line downstream of the storage reservoir and is controlled by the pressure of the contaminated gas at the outlet of the plant.

BRIEF DESCRIPTION OF THE FIGURES OF THE DRAWING

Other features and advantages of the invention will become apparent from the following description, given by way of example and without implying any limitation, with reference to the appended drawings, in which.

DETAILED DESCRIPTION OF THE PREFERRED EMBODIMENTS

Figure 1:
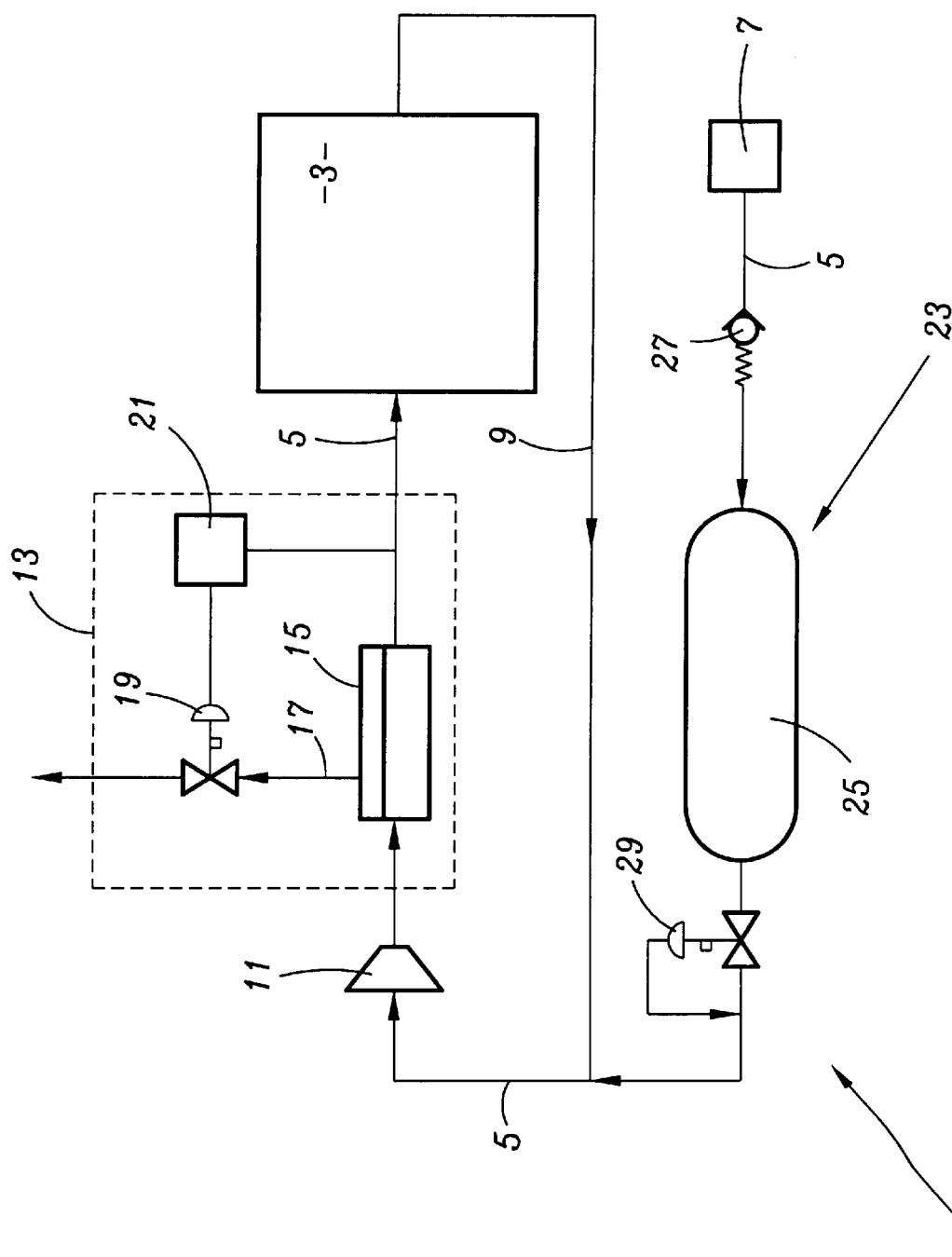
FIG. 1 is a diagram of a first illustrative embodiment of a device according to the invention.

FIG. 1 represents a diagram of a first illustrative embodiment of a device 1 for supplying a purified gas, for example highly pure nitrogen containing only a few tens of ppm of impurities, to a plant 3 such as, for example, a silicon wafer storage space for microelectronics.

The device 1 according to the invention comprises a feed line 5 connected, on the one hand, to a source 7 of the substantially pure gas, such as a storage tank or a production unit, and on the other hand to an inlet of the plant 3.

The device 1 furthermore comprises a line 9 for recovering, at the outlet of the plant 3, the purified gas which has been contaminated with impurities (for example, $O_2$, $CO_2$, $H_2$, etc.) as it passed through the plant 3.

This recovery line 9 is connected downstream of the source 7 to the feed line 5 in order to introduce into it the contaminated gas which has been recovered at the outlet of the plant 3.

Between the point where the line 9 is connected to the line 5 and the plant 3, a compressor 11 and means 13 for separating the impurities from the contaminated gas by permeation are arranged in series.

The compressor 11 is advantageously not lubricated, so that it does not pollute the gases which it compresses.

The separation means 13 comprise a permeater 15 whose membrane is, for example, chosen in such a way that the permeation rate of the impurities through the membrane is higher than that of the purified gas to be supplied to the plant, that is to say nitrogen. In this case, the permeate obtained principally consists of impurities.

This permeate is discharged via a discharge line 17 connected to a corresponding outlet of the permeater 15.

The device furthermore comprises, arranged in the line 17, a valve 19 for regulating the flow rate of the permeate discharged. This valve 19 is controlled by means 21 for detecting the residual level of impurities in the purified gas in the feed line 5 at the outlet of the permeater 15. The detection means 21 comprise, for example, one or more gas analysers.

In addition, in order to provide the device 1 according to the invention with some degree of autonomy in case of a fault with the source 7, due for example to shutting down the production plant or the fact that the storage tank is empty, the device comprises buffer storage means 23 comprising a reservoir 25 for storing the substantially pure gas under pressure, a non-return valve 27 arranged upstream of the reservoir 25, as well as a regulating valve 29 controlled by the pressure of the contaminated gas at the outlet of the plant 3.

The device 1 in FIG. 1 operates in the following way.

As it passes through the plant 3, the purified gas which was introduced into the plant with a certain pressure, has its pressure reduced. Furthermore, it is progressively contaminated with impurities and recovered at the outlet by the recovery line 9.

Subsequently, the contaminated gas is introduced into the feed line 5, is compressed by the compressor 11 and passes through the permeater 15.

If the detection means 21 detect that the level of impurities in the purified gas is below a certain threshold set in relation to the purity levels acceptable to the plant 3, they cause the valve 19 to be closed. In this case, the permeate is not discharged and no pure gas is delivered by the source 7 and/or the reservoir 25 into the feed line 5 downstream of the valve 29. The device consequently operates autonomously in a closed loop.

If the detection means 21 detect that the level of impurities in the purified gas exceeds the aforementioned threshold, they cause the valve 19 to open partially, this partial opening being proportional to the surplus level of impurities in the purified gas at the outlet of the permeater 15. In this case, the permeater is discharged and the source 7 and/or the reservoir 25 supply the extra pure gas needed to replace the quantity of gas discharged through the line 17. The device consequently operates in a partially opened loop.

It can therefore be seen that the separation means 13 are active only if the level of impurities in the purified gas to be supplied to the plant 3 reaches a certain threshold. Given that the permeate is discharged in accordance with the level of impurities in the purified gas, the quantity of pure gas to be supplied by the source 7 and/or the reservoir 25 can be reduced considerably, which leads to a significant reduction in the running costs of the plant 3.

If, among the impurities generated by the plant 3, there is a so-called "critical" species, for example oxygen, which predominates, then it is envisageable for the means 21 to have a simplified design and to detect only this critical species. The cost of the device can thus again be reduced.

Figure 2:
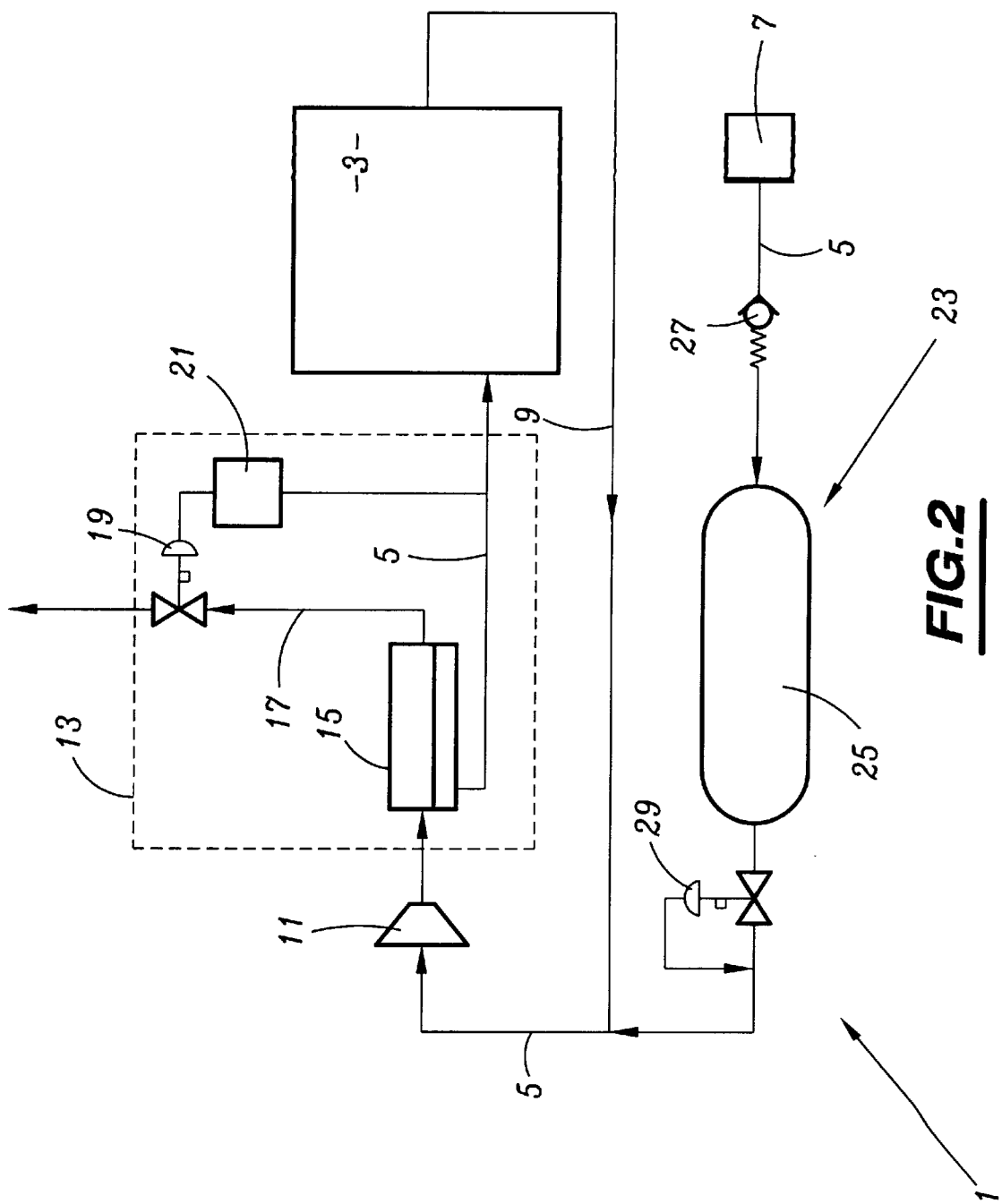
FIG. 2 is a diagram of a second illustrative embodiment of a device according to the invention.

FIG. 2 represents a second illustrative embodiment of the device according to the invention. In this figure, the elements identical to those in FIG. 1 have the same reference numbers.

The device 1 in this FIG. 2 differs from that in FIG. 1 only by the choice of the nature of the connections of the discharge line 17 and of the feed line 5, and possibly by the choice of the membrane of the permeater 15.

Specifically, in this example, the permeation rate of the impurities is lower than that of the gas to be supplied to the plant, that is to say nitrogen. In this case, the permeate obtained at the outlet of the permeater principally consists of the purified gas to be supplied to the plant.

This permeate is conveyed through the line 5 to the plant 3, and the impurities are discharged via the discharge line 17 connected to the corresponding so-called "reject" outlet of the permeater 15.

This illustrative embodiment operates in a similar way to that in FIG. 1 and makes it possible, in the case of nitrogen, to purify, in particular, hydrocarbons and/or fluorinated gases by permeation.

Figure 3:
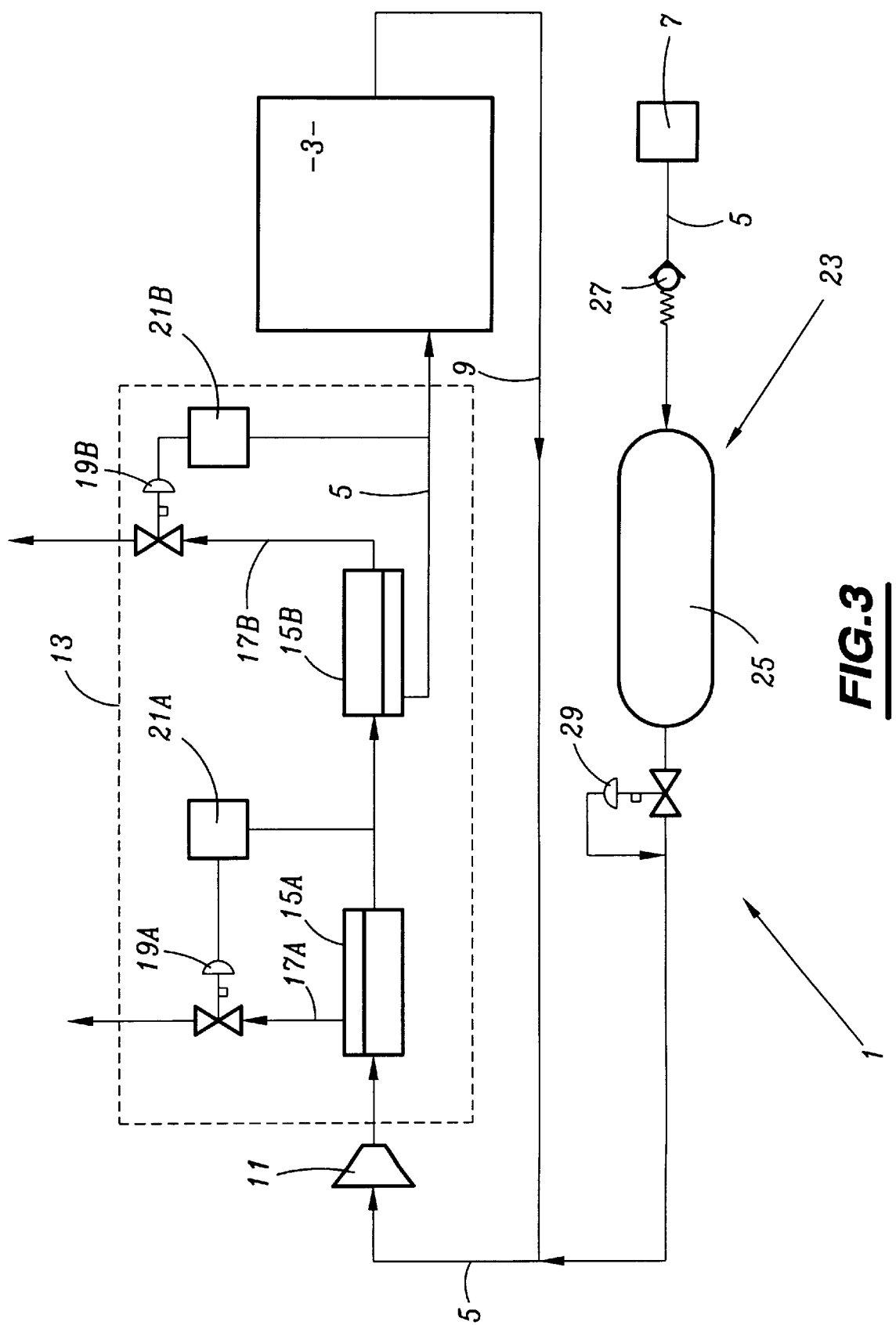
FIG. 3 is a diagram of a third illustrative embodiment of a device according to the invention.

The illustrative embodiment in FIG. 3 is a combination of the illustrative embodiments in FIGS. 1 and 2. In this FIG. 3, the elements identical to those in FIGS. 1 and 2 have the same reference numbers, the elements associated specifically with the respective embodiments in FIGS. 1 and 2 being distinguished respectively by the letters A and B added to the reference number.

Specifically, the device 1 in FIG. 3 comprises, arranged in series, a first 15A and a second 15B permeater. The way in which the permeaters 15A and 15B operate is identical to that of the respective permeaters represented in FIGS. 1 and 2. Thus, the permeate of the permeater 15A principally consists of impurities whose permeation rate is higher than that of the purified gas, and the permeate of the permeater 15B principally consists of the purified gas to be supplied to the plant 3. Of course, the means 21A for detecting the level of impurities at the outlet of the permeater 15A are designed to detect impurities whose permeation rate is higher than that of the purified gas, and the means 21B to detect impurities whose permeation rate is lower than that of the purified gas.

The way in which this combined device operates is similar to that of the individual devices in FIGS. 1 and 2 connected in series.

It is thus possible to recycle a very significant proportion of the contaminated gas and to reduce the running costs of the plant accordingly.

What is claimed is:

1. Device for supplying a purified gas to a plant which is purged using this purified gas, comprising a feed line which is connected, on the one hand, to a source of a substantially pure gas and, on the other hand, to an inlet of said plant, said purified gas being contaminated with impurities on passing through said plant, characterized in that it furthermore comprises a line which is intended to recover said contaminated gas at an outlet of said plant and is connected to said feed line and, arranged one after the other downstream of where a recovery line is connected to said feed line, a compressor and means for separating the impurities from said contaminated gas by permeation in order to supply a purified gas to said plant.

2. Device according to claim 1, characterized in that the permeate obtained by said means for separating principally consists of impurities.

3. Device according to claim 2, characterized in that the separation means comprise, at least one permeater, a line for discharging the impurities, and a valve which is arranged in this impurity discharge line and is controlled by means for detecting the residual level of impurities in the purified gas at said outlet of said permeater.

4. Device according to claim 2, characterized in that it furthermore comprises, arranged in the feed line upstream of where said recovery line is connected to the feed line, means for buffer storage of said substantially pure gas.

5. Device according to claim 1, characterized in that the permeate obtained by said means for separating principally consists of said purified gas.

6. Device according to claim 5, characterized in that the separation means comprise, at least one permeater, a line for discharging the impurities, and a valve which is arranged in this impurity discharge line and is controlled by means for detecting the residual level of impurities in the purified gas at the outlet of said permeater.

7. Device according to claim 5, characterized in that it furthermore comprises, arranged in the feed line upstream of where said recovery line is connected to the feed line, means for buffer storage of said substantially pure gas.

8. Device according to claim 1, characterized in that the separation means comprise, arranged in series, a first and a second permeater, the permeate of one of the permeaters principally consisting of impurities whose permeation rate is higher than that of said purified gas to be supplied to the plant, and the permeate of the other principally consisting of said purified gas.

9. Device according to claim 8, characterized in that the separation means comprise, at least one permeater, a line for discharging the impurities, and a valve which is arranged in this impurity discharge line and is controlled by means for detecting the residual level of impurities in the purified gas at the outlet of said permeater.

10. Device according to claim 8, characterized in that it furthermore comprises, arranged in the feed line upstream of where said recovery line is connected to the feed line, means for buffer storage of said substantially pure gas.

11. Device according to claim 1, characterized in that the separation means comprise, at least one permeater, a line for discharging the impurities, and a valve which is arranged in this impurity discharge line and is controlled by means for detecting the residual level of impurities in the purified gas at the outlet of said permeater.

12. Device according to claim 11, characterized in that it furthermore comprises, arranged in said feed line upstream of where said recovery line is connected to said feed line, means for buffer storage of said substantially pure gas.

13. Device according to claim 1, characterized in that it furthermore comprises, arranged in said feed line upstream of where said recovery line is connected to said feed line, means for buffer storage of said substantially pure gas.

14. Device according to claim 13, characterized in that said buffer storage means comprise a reservoir for storing said pure gas under pressure, a non-return valve arranged in said feed line upstream of said storage reservoir, and a regulating valve which is arranged in said feed line downstream of said storage reservoir and is controlled by the pressure of the contaminated gas at said outlet of said plant.

* * * * *